(12) United States Patent
Hall et al.

(10) Patent No.: US 10,057,163 B2
(45) Date of Patent: Aug. 21, 2018

(54) SENDING COMMUNICATION BETWEEN A REMOTE DEVICE AND A CONTROL SERVER

(71) Applicants: David R. Hall, Provo, UT (US); Mark Hall, Springville, UT (US); Craig Boswell, Draper, UT (US)

(72) Inventors: David R. Hall, Provo, UT (US); Mark Hall, Springville, UT (US); Craig Boswell, Draper, UT (US)

(73) Assignee: Hall Labs LLC, Provo, UT (US)

( * ) Notice: Subject to any disclaimer, the term of this patent is extended or adjusted under 35 U.S.C. 154(b) by 98 days.

(21) Appl. No.: 15/378,407

(22) Filed: Dec. 14, 2016

(65) Prior Publication Data

US 2018/0006939 A1 Jan. 4, 2018

Related U.S. Application Data

(63) Continuation-in-part of application No. 15/198,384, filed on Jun. 30, 2016, now Pat. No. 9,967,883.

(51) Int. Cl.
| | | |
|---|---|---|
| *H04W 4/00* | (2018.01) | |
| *H04L 12/741* | (2013.01) | |
| *H04W 12/06* | (2009.01) | |
| *H04L 12/815* | (2013.01) | |
| *H04L 12/947* | (2013.01) | |
| *H04W 4/70* | (2018.01) | |

(52) U.S. Cl.
CPC ............ *H04L 45/74* (2013.01); *H04L 47/22* (2013.01); *H04L 49/25* (2013.01); *H04W 12/06* (2013.01); *H04W 4/005* (2013.01); *H04W 4/70* (2018.02)

(58) Field of Classification Search
CPC ......... H04L 45/74; H04L 47/22; H04L 49/25; H04W 4/14; H04W 12/06; H04W 72/0406; H04W 88/184
USPC ................. 370/329, 338, 401; 455/411, 466
See application file for complete search history.

(56) References Cited

U.S. PATENT DOCUMENTS

| | | | |
|---|---|---|---|
| 2006/0072143 A1* | 4/2006 | Wilson | H04W 88/184 358/1.15 |
| 2007/0275738 A1* | 11/2007 | Hewes | H04W 4/14 455/466 |
| 2015/0305008 A1* | 10/2015 | Kim | H04W 72/0406 370/329 |

* cited by examiner

*Primary Examiner* — Harun Chowdhury (57) ABSTRACT

A method for communicating between a remote device and a control server is described. The method include receiving a reduced packet when a reduced server identifier matches a control server, identifying the control server, constructing a device network packet, sending the device network packet to the control server, accepting a control network packet, building a reduced control packet, and transmitting the reduced control packet to the remote device.

17 Claims, 10 Drawing Sheets

| Ver 611 | IHL 612 | Type 613 | Total Length 614 | |
|---|---|---|---|---|
| Identification 615 | | | Flags 616 | Fragment Offset 617 |
| Time To Live 618 | | Protocol 619 | Header Checksum 620 | |
| Source Address 621 | | | | |
| Destination Address 622 | | | | |
| Options 623 | | | | |
| Payload 624 | | | | |

630

| Reduced Destination Address 631 |
|---|
| Data 632 |

SENDING COMMUNICATION BETWEEN A REMOTE DEVICE AND A CONTROL SERVER

CROSS-REFERENCE TO RELATED APPLICATIONS

This application claims the benefit as a Continuation-in-Part of, and incorporates by reference, U.S. patent application Ser. No. 15/198,384.

TECHNICAL FIELD

The disclosure relates generally to the field of communicating via a network with a device. Specifically, the disclosure relates to wireless communication between devices that have limited connectivity and control servers.

BACKGROUND

Wireless IoT communication is the cutting edge of modern consumer and commercial electronics. However, some significant roadblocks stand in the way of IoT ubiquity. In particular, the limited range of current protocols, such as Wi-Fi, Bluetooth, Z-Wave, and Zigbee, limit the applications of those networks, particularly in RF-noisy environments and applications that require long-range communication (which is further limited by government regulation). Additionally, different devices require different amounts of data to control those devices, and typical systems sacrifice range for speed. Thus, low-data devices are range limited by unnecessary data speed. This is especially the case for high-speed protocols such as Wi-Fi, Bluetooth and Zigbee. Another issue facing IoT networks is FCC regulation. The FCC limits power output, and most protocols transmit at maximum power levels, significantly beyond what is necessary to have a stable link, wasting power and unnecessarily reducing battery life. Yet another issue facing IoT networks is that processing an entire data packet to determine whether that information is intended for those devices results in unnecessary power drain and slower transmission speeds of data across the IoT networks. Additionally, FCC regulations may provide government-imposed limits, such as the limit that the maximum transmitter output power, fed into the antenna, not exceed 30 dBm (1 watt) for unlicensed wireless equipment operating in the ISM band.

Some protocols, such as Z-wave, may address these issues by communicating on the low data 900 MHz ISM band, but are still significantly range-limited. For example, even when fully meshed, the range of a Z-wave network is only 160 meters, which is limiting in many settings. Additionally, Z-wave and other similar protocols operate on a single frequency, and rely on time-division and other similar multiplexing to communicate with multiple devices. This makes these protocols especially susceptible to collisions and interference with other networks and devices, and requires additional data to secure communications, all of which increases the amount of data that needs to be transmitted and decreases range. The requirement for multiple hubs and/or devices to mesh and extend the network also increases costs associated with the network, with only marginal improvements in range.

Other wireless networks, such as cellular networks, rely on large and expensive antenna arrays, with high power output and expensive high-gain receivers. Because of expense and regulatory limitations, such networks are not feasible for most, if not all, commercial IoT applications, and are certainly out of the question for private residential settings. Thus, despite efforts in the industry, significant problems still remain.

Other types of protocols which use wireless communication include Bluetooth and Wi-Fi. Each protocol has its own range limitations. Additionally, many protocols such as Bluetooth or Wi-Fi require a two-way connection between a client and an access point. At times when the connection between a smart device, such as a Blue-tooth enabled furnace, and a host is lost, then the host will drop the smart device.

Various protocols are used for organizing information that is sent over a network; standard protocols allow for various devices to communicate with each other. For example, the IPX packet begins with a header which has the following fields and the number of bytes allocated for that field follows in parentheses: Checksum (2 bytes), Packet Length-including the IPX header (2 bytes), Transport Control, also known as hop count (1 byte), Packet Type (1 byte), Destination address (12 bytes), and Source address (12 bytes). The IPX packet protocol had limited data routing abilities and became disfavored with the rise of the Internet. IPX has been generally replaced by the TCP/IP protocol, which is used for exchanging data between a single network device and another network device. The User Datagram Protocol is a transport layer protocol on TCP/IP that is designed for broadcasting messages to multiple network devices.

TCP/IP consists mainly of TCP (Transmission Control Protocol) and IP (Internet Protocol). The IP protocol is used for addressing and routing packets between hosts. An IP packet consists of an IP header and an IP payload.

A datagram is a basic transfer associated with a packet-switched network. Typically, a datagram is structured to include a payload and a header. Datagrams provide two-way communication services across a packet switched network. The delivery, arrival time, and order of arrival of datagrams need not be guaranteed by the network.

A typical IP packet consists of the following IP headers: Source IP Address (the IP address of the original source of the IP datagram); Destination IP Address (the IP address of the final destination of the IP datagram); Identification (used to identify a specific IP datagram and to identify all fragments of a specific IP datagram if fragmentation occurs); Protocol (informs IP at the destination host whether to pass the packet up to TCP, UDP, ICMP, or other protocols); Checksum (a simple mathematical computation used to verify the integrity of the IP header); and Time-to-Live (designates the number of networks on which the datagram is allowed to travel before being discarded by a router; the TTL is set by the sending host and is used to prevent packets from endlessly circulating on an IP internetwork; when forwarding an IP packet, routers are required to decrease the TTL by at least one). See https://technet.microsoft.com/en-us/library/cc958827.aspx.

The use of the TCP/IP protocol may result in cost issues, since following the TCP/IP protocol can use up bandwidth and create bandwidth issues. The packet information that is part of the TCP/IP protocol may significantly increase total transmitted data in comparison to the user's intent on communicating.

A protocol may examine a packet and handle information within the packet. In one example, a network packet is embedded in another packet, such as "IP masquerading." When a packet is sent, an encapsulated packet is prepared and sent as the payload data. When the packet is received, the payload data is removed and examined, and the encapsulated packet is then sent over a network.

Control data is an inherent part of the transport method. Control data is transmitted in addition to the actual data transmitted by user. The control data is removed when the data arrives. A protocol, such as the IP protocol, includes data to control the routing of the payload data.

In one example, the IP version 4 control data sends fourteen fields. These fields include a version, an internet header length, a differentiated service code point, and explicit Congestion Notification, a total packet length, an identification field, a number of flags, a fragment offset, a time to live, a protocol, a header checksum, a source address, a destination address, and a number of options.

Delivering a wireless communication over a distance is a known problem in the art. For example, the Bluetooth® wireless communication protocol is relatively short range, and some may use mesh nodes as repeaters in an attempt to extend the range of the Bluetooth® wireless communication protocol. Communications may be transmitted over as many as 20 mesh hops or more. Mesh nodes may allow the extension of a transmission area; however, the use of mesh nodes typically adds a cost overhead to retransmitting packets. Users generally set up the nodes to be in relatively close physical proximity to each other. When the transmission distance of the protocol is exceeded, mesh nodes may sever the proximity network and prevent communication. When expanding the distance of wireless transmission, such as to a barn that is remotely located from a residence, a preferred method in the art is to install a physical wire connection.

Additionally, after the attack on Sep. 11, 2001, builders are now more likely to use concrete cores; for example, modern skyscrapers may use thick concrete cores which obstruct wireless signals; in some instances, the builders may drill holes of 50 feet or longer and pass an Ethernet cable or other hardwire through thick building materials which obstruct wireless signals.

BRIEF SUMMARY

A method for sending communication between a remote device and a control server is described. A reduced packet is received from a remote device when a reduced server identifier in the reduced packet matches a value indicating a control server. The reduced packet includes a reduced server identifier and a data payload. The reduced packet is received over a communication device. A control server is identified based on the reduced server identifier. A device network packet based on the reduced packet is constructed to send to the control server. The device network packet is sent over a computer network to the control server. A control network packet is accepted from the control server over the computer network. A reduced control packet is built. The reduced control packet includes the reduced server identifier and a control instruction. The reduced control packet is transmitted to the remote device using a wireless transmission protocol.

A method for authenticating a remote device with a control server is described. An authentication request packet is received from a remote device. The authentication request indicates a request to authenticate with a control server. A network authentication packet is constructed to send to the control server based on the reduced packet, the network packet consisting of a network protocol header and the authentication request packet. The network authentication packet is sent over a computer network to the control server. An authentication confirmation packet is accepted from the control server over the computer network. A reduced authentication confirmation packet is built. The reduced confirmation packet has a reduced device identifier and an authentication confirmation code. The reduced confirmation packet to the remote device is transmitted using a wireless transmission medium.

An apparatus to authenticate a remote device is described. The apparatus includes a processor, a wireless communication interface, a network communication interface, and a non-transitory memory storage unit. The non-transitory memory storage unit includes computer program code that, when executed by the processor, causes the processor to perform a particular task. The computer program code, when executed by the processor, causes the processor to receive a reduced packet from a remote device using the wireless communication interface when a reduced server identifier in the reduced packet matches a value indicating a control server. The reduced packet has a reduced server identifier and data payload. The computer program code, when executed by the processor, causes the processor to identify, based on the reduced server identifier, a control server. The computer program code, when executed by the processor, causes the processor to construct a device network packet to send to the control server based on the reduced packet. The computer program code, when executed by the processor, causes the processor to send, using the network communication interface, to the control server, the device network packet. The computer program code, when executed by the processor, causes the processor to accept, using the network communication interface, from the control server, a control network packet. The computer program code, when executed by the processor, causes the processor to build a reduced control packet, the reduced control packet comprising the reduced server identifier and a control instruction. The computer program code, when executed by the processor, causes the processor to transmit, using the wireless communication interface, the reduced control packet to the remote device.

BRIEF DESCRIPTION OF THE DRAWINGS

A more particular description of the invention briefly described above is made below by reference to specific example. Several examples are depicted in drawings included with this application. An example is presented to illustrate, but not restrict, the invention.

DETAILED DESCRIPTION

A detailed description of the claimed invention is provided below by example, with reference to examples in the appended figures. Those of skill in the art will recognize that the components and steps of the invention as described by example in the figures below could be arranged and designed in a wide variety of different configurations without departing from the substance of the claimed invention. Thus, the detailed description of the examples in the figures is merely representative examples of the invention, and is not intended to limit the scope of the invention as claimed.

In some instances, numerical values are used to describe features such as spreading factors, output power, bandwidths, link budgets, data rates, and distances. Though precise numbers are used, one of skill in the art recognizes that small variations in the precisely stated values do not substantially alter the function of the feature being described. In some cases, a variation of up to 50% of the stated value does not alter the function of the feature. Thus, unless otherwise stated, precisely stated values should be read as the stated number, plus or minus a standard variation common and acceptable in the art.

For purposes of this disclosure, the modules refer to a combination of hardware and program instructions to perform a designated function. Each of the modules may include a processor and memory. The program instructions are stored in the memory, and cause the processor to execute the designated function of the modules. Additionally, a smartphone app and a corresponding computer system for the smartphone app may be used to control the access control.

A purpose of the claimed methods and computer program product is to facilitate the transfer of information between a wireless networking protocol and a networking protocol while presenting to the wireless networking protocol an image of a control server. The wireless networking protocol may include any protocol used with Internet of Things ("IoT") including Bluetooth, ZigBee, Ethernet, WirelessHART, DigiMesh, ISA100.11a, IEEE 802.15.4, NFC, ANT, Eddystone, EnOcean, Wi-Fi, and WiMAX. An initial reduced packet is smaller than a corresponding initial network packet—the reduced packet is the payload that remains after the header has been removed; various combinations of possible reduced packets exist and nonlimiting examples are: a reduced packet that 1) only has an instruction for altering the status of a remote device, a device address, and a security token, 2) a reduced packet that only has an instruction for altering the status of a remote device and a remote device address; 3) and a reduced packet that only has an instruction for altering the status of a remote device. The reduced packet may be sent using a lower-bandwidth wires communication. The remote device indicates a control server to which communication is sent. A relay device receives reduced communication packet and sends the information in the reduced communication packet to a control server. The device may be communicatively connected to a control system. The method may be implemented as a part of another device, such as a wireless network router, an http router, or a general purpose computing device. The control server responds to the relay device. The relay device presents to the remote device that it is the control server, providing the remote device the image of communicating directly with the control server.

The method for communicating with a network device may be implemented by an apparatus that maintains a two-way connection between a remote device and a control server. In one example access control is provided by approaching an enabled household device, such as a lock, and pressing a button. The button causes the household device to wake up and initiate contact with a control server. A wireless router implementing the method receives the contact request from the remote device, encapsulates the request in a network packet, and sends the network packet to the control server. The control server responds by wrapping a response in a network packet and sending it to a wireless router which implements the method. The wireless router removes the response from the network packet and sends it, using wireless transmission technology, to the remote device.

With a control server connected to the Wi-Fi router that implements a method, a two-way connection may be maintained. The control server and the Wi-Fi router may communicate over a hardwired connection such as Ethernet, coaxial cable, or fiber optic cable. The device data server and the Wi-Fi router may communicate using a wireless protocol, such as 802.1(g), 802.1(n), or another wireless protocol.

Definitions

For purposes of this disclosure as used in the present specification and in the appended claims:

A "device list" is a list of one or more devices that are connected to or are authorized to be connected to a server; the device list may contain information about the devices such as device names, the protocols used to connect the devices, addresses, the status of the device, and other information; a device list may be in a data format that may be stored on a non-transitory storage medium.

A "household device" is an apparatus that may be used around a residential dwelling. A household device may be used in commercial settings to perform the same tasks as in a residential setting. A household device may be, but is not limited to, a lock, a door knob, a microwave oven, a slow cooker, an oven, a stove, a refrigerator, etc.

A "status code" is an instruction for altering the status of a remote device to a certain state, such as "on", "off", or "standby mode". Typically, a different status code is used to signify "on" from the status code which is used to signal "off".

"Unwrapping" is to perform a type of unencapsulation which means to start with a packet, such as an IP packet, and form a reduced packet by removing the payload data from the nonpayload data, which, in the example of an IP packet, would be Internet Protocol header data; unwrapping may be performed on any protocol used for transmitting data.

"Wrapping" is to perform a type of encapsulation which means combining nonpayload data, such as protocol header data like IP protocol header data for an IP packet, with payload data to form a network packet; wrapping may be performed on any protocol used for transmitting data.

Figure 1:
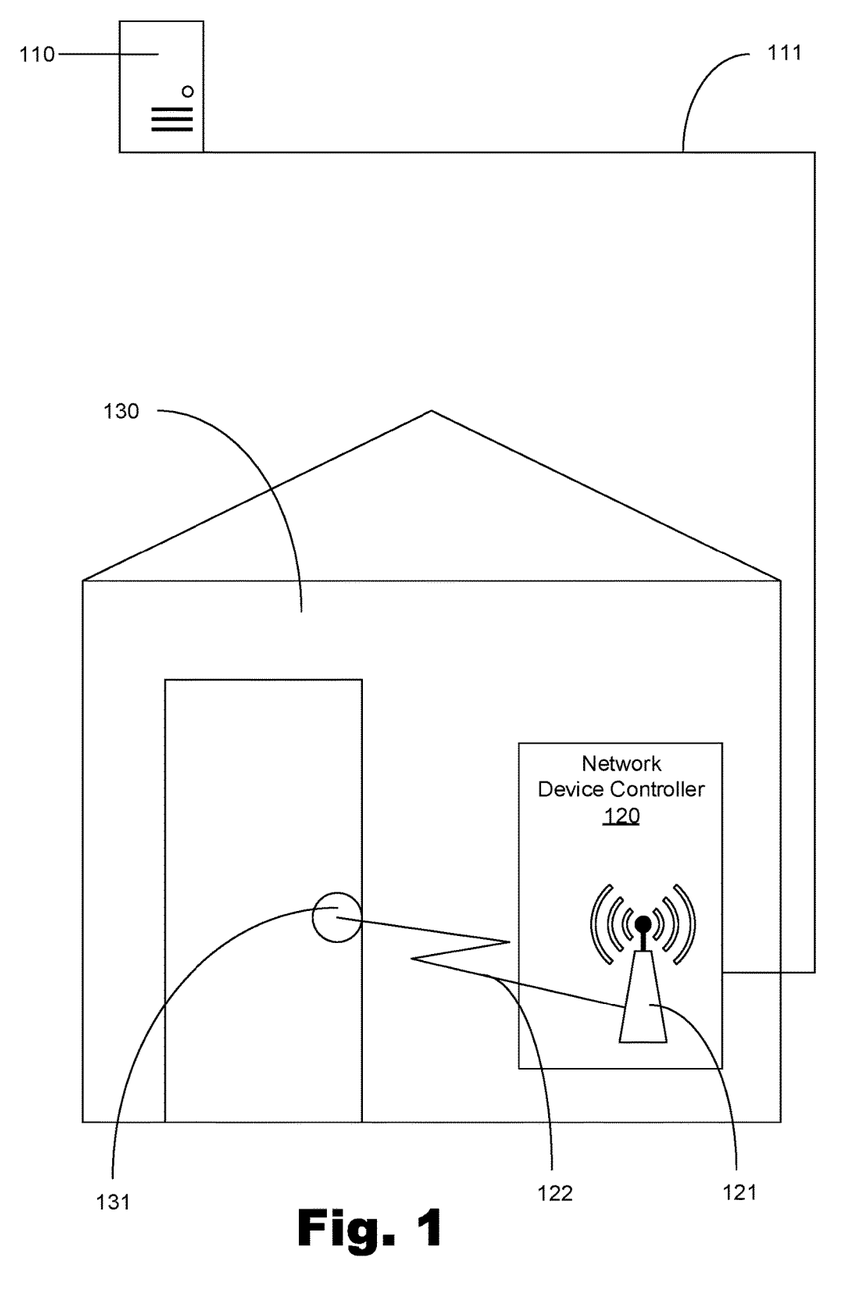
FIG. 1 illustrates an apparatus that communicates with a control server and a household device.

Referring now to the figures, FIG. 1 illustrates an apparatus that implements a method to send communication between a remote device and a control server. FIG. 1 illustrates a network device controller (120) using a wireless connection (122) to communicate with a remote device (131). The network device controller (120) maintains communication (111) with a control server (110). The network device controller (120) receives data from the remote device (131) that is addressed to the control server (110). The network device controller (120) appears to the remote device (131) to be the control server (110). The illusion provided by the network device controller (120) may allow the remote device (131) to be unaware of the actual distance to the control server (110). The network device controller (120) communicates and transforms information sent from the control server (110) and the remote device (131). The network device controller (120) also communicates from the remote device (131) and the control server (110). The network device controller (120) may communicate with a number of remote devices (131) using a wireless communication protocol (122) in a house (130) or business. The network device controller (120) communicates with the control server (110) using a networking protocol (111).

The network device controller (120) may receive, from the remote device (131), a reduced packet. The reduced packet is addressed to a control server (110). The network control device packet (120) wraps the reduced packet to send to the control server (110). The remote device (131) is unaware that the network device controller (120) is not the control server (110). The network device controller (120) may wrap the reduced packet in a network packet to send to a control server (110). Network device controller (120) may communicate the reduced packet to the control server (110).

The network device controller (120) may receive a network packet in response to the reduced packet sent to the control server (110). The network packet includes a response to the remote device (131). The network device controller (120) removes a reduced response packet and sends the reduced response packet to the remote device (131). The network device controller (120), in acting on behalf of the control server (110) masquerades as the control server (110). The network device controller (120) may masquerade as a number of control servers to a number of different remote network devices, presenting to each remote network device that the network device controller (120) is the control server.

The device data server (110) may send to the network device controller (120) a reduced packet wrapped in a network packet, with the ultimate destination being the remote device (131). In some embodiments, network device controller (120) unwrap a network packet to identify a reduced packet for the remote device (131). In another embodiment network device controller (120) uses a network packet to derive a reduced packet to send to the remote device (131). The reduced packet may include data to operate the remote device (131). The reduced packet typically contains less information than the network packet that was received from the device data server (110). The reduced packet may not have sufficient information to be routed, but may instead be communicated directly from the device data server (110) to the network controller (120).

Figure 2:
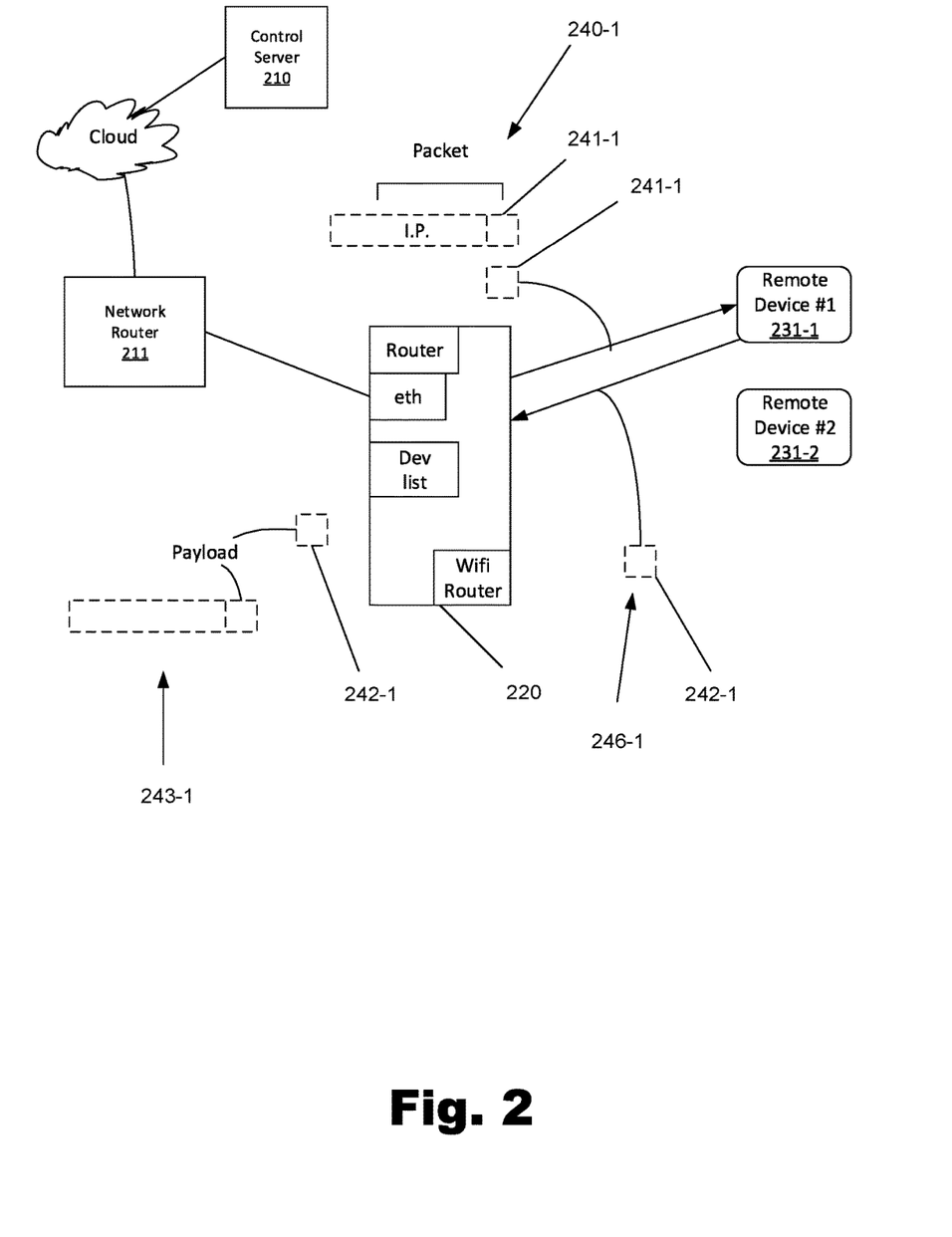
FIG. 2 illustrates a system including an apparatus for communicating with a control server and a household device.

Referring now to FIG. 2, a remote device controller (220) is depicted. The remote device controller (220) may include a Wi-Fi router or other types of routers. The remote device controller (220) may be a computer system that includes a Wi-Fi router, a device list, an Ethernet router or port for connecting to a Wi-Fi router of a server or other device, and one or more routers for connecting to a server using a protocol such as Bluetooth®. The remote device controller (220) may be connected to the cloud by a network router (211). The remote device controller (210) may also be connected with a remote device (231). The remote device controller (2220) may be configured to perform a type of unencapsulation referred to herein as "unwrapping," which means to take a packet, such as an IP packet, and form a reduced packet by removing the payload data from the nonpayload data, which in the example of an IP packet would be Internet Protocol header data; The remote device controller (220) may then transmit the reduced packet (24101) to remote device one (231-1). Use of data unwrapping and corresponding data "wrapping", which is a form of encapsulation in which nonpayload data is added to payload data to form a network packet, may be used so that the remote device (231) may appear to be communicating directly with a control server (210) at a longer range than is typically used, such as over 0.5 miles or even over 0.9 miles. The remote server (1004) may have a device list, a Wi-Fi router, and other routers for communicating with devices using different protocols other than Wi-Fi. The communication between the remote device (231) and the control server (210) may at times to allow "handshaking" between the remote device (231) and the control server (210) to establish a connection. A control server (210) may be configured to identify the payload that is sent by the remote device (231) and determine for which control server (210) the reduced packet is intended. The remote device controller (220) appears the remote devices (231) to be a control server (210). The remote device controller (220) may also derive the payload for the control server (210 deriving the network header based on the payload data received. At times, a more secure method may be used, where a security token is transmitted. The network device controller (220) may then send the device command to a smart device (231) such as a Bluetooth®-enable device, such as a door lock, connected remote device controller (220) via an appropriate router, such as a Bluetooth® router. Network device controller (220), or may be connected to multiple devices using multiple protocols and it may have a device list. The network device controller (220) may connect to a number of control servers (210). A reduced packet may be under 200 bytes or bits, may be under 64 bits or bytes, may include 16-bit encryption, may be as small as a single bit which encodes information for instructing a remote device to change state.

An overall example according to FIG. 2 will now be given. The remote device controller (220) receives a reduced packet (246-1) from a remote device (231-1) when a reduced server identifier in the reduced packet matches a value indicating a control server (210). The reduced packet (246-1) may consist of a reduced server identifier and a data payload. The reduced packet (246-1) may be transmitted using a radio communication system that has limited or restricted bandwidth. The reduced packet (246-1) may be a single byte, two bytes, or four bytes. The reduced packet (246-1) contains less information than a network packet.

The remote device controller (220) receives, based on a reduced server identifier, a reduced packet. The remote device controller (220) appears to be the control server (210). The remote device controller (220) may wrap the reduced packet (246-1) in a network packet. The remote device controller (220) may derive a network packet based on the reduced packet (246-1).

The remote device controller (220) identifies, based on the reduced server identifier, a control server (210). The reduced server identifier may be a portion of the network address of the control server (210). The remote device controller (220) may maintain a device list associating a device with a control server address. A device may be assigned to a control server (210) based on the type of device.

The remote device controller (220) constructs a device network packet (243-1) to send to the control server (210), based on the reduced packet (246-1). In this example, the remote device controller (220) wraps the reduced packet (246-1) in a network packet (243-1) by making the reduced network packet (246-1) the payload data for the network packet (243-1).

The remote device controller (220) sends the network packet (243-1) over a computer network to the control server (220). The network packet (243-1) may be routed over a computing cloud or internet connection. The network packet (243-1) may be routed using a secure connection, such as a virtual private network.

The remote device controller (220) accepts over the computer network, from the control server (210), a control network packet (240-1). The control packet (240-1) includes a network protocol header and payload data. In this example, the payload data is a reduced network packet (241-1) intended for a remote device (231-1).

The remote device controller (220) builds a reduced control packet (241-1). The reduced control packet consists of the payload data from the network control packet (240-1). The control packet (241-1) may consist of a reduced device identifier and a control instruction.

The remote device controller (220) transmits the reduced control packet (241-1) to the remote device (231-1) using a wireless transmission medium. The remote device (231-1) then acts on the reduced control packet (241-1).

Figure 3:
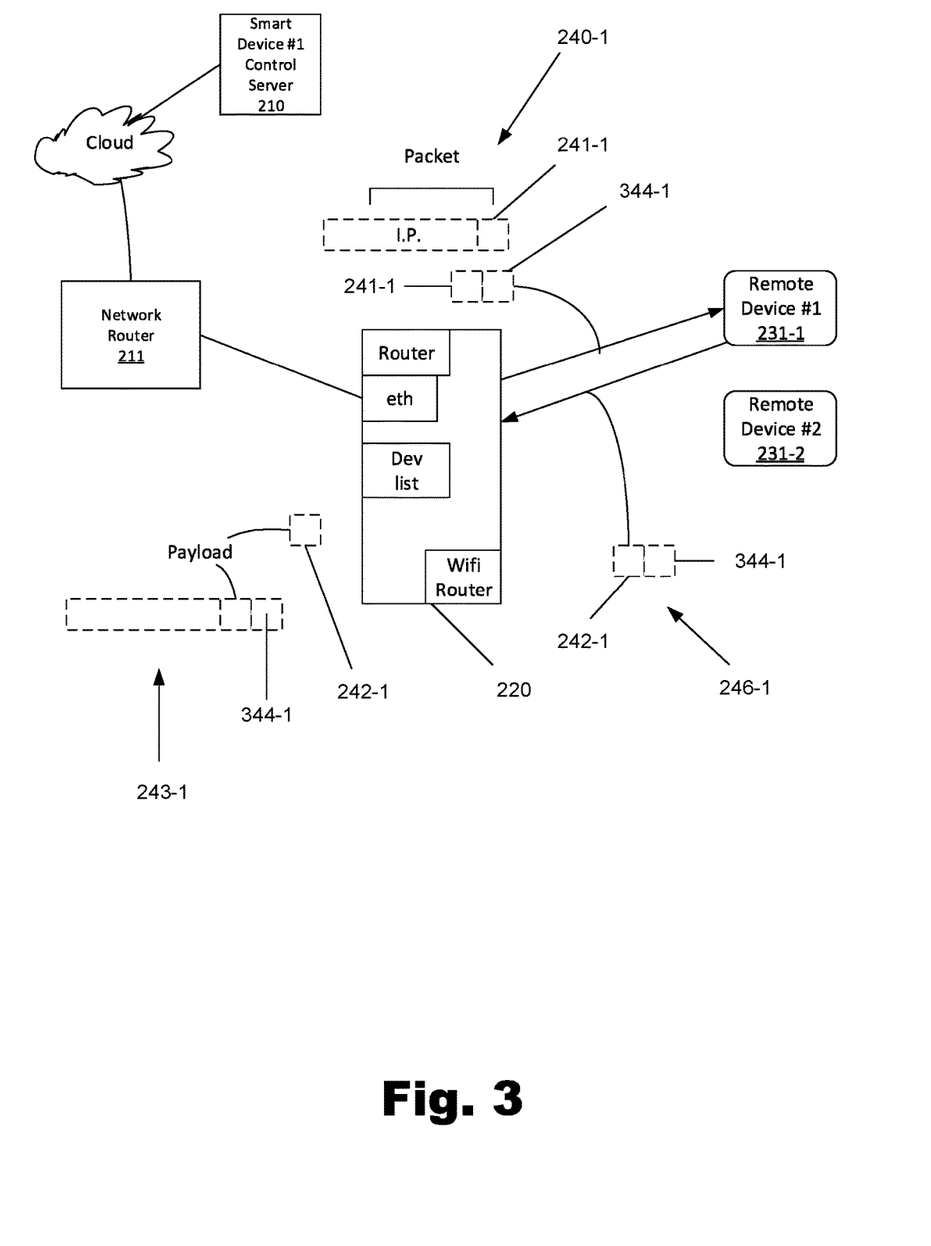
FIG. 3 illustrates a system including an apparatus for communicating with a control server and a household device.

Referring now to FIG. 3, a system including a remote device controller (220) is depicted. FIG. 3 represents an extension of the example in FIG. 2 including a security token (344-1). In this example, the remote device (231-1) sends a reduced network packet (246-1) with a security token (344-1). The reduced network packet contains payload data (242-1). The security token (344-1) may be used to encrypt the payload data (242-1). The security token may provide data integrity verification through a checksum value or other methods of validating the payload data.

The security token (344-1) may be sent with the payload data (242-1) sent in a network packet (243-1) through a network router (211) to a control server (210). The control server (210) may send a network packet (240-1) back to the network device controller (220). The network device controller removes the payload data (241) and a security token (344-1) to send back to the remote device (231-1).

Figure 4:
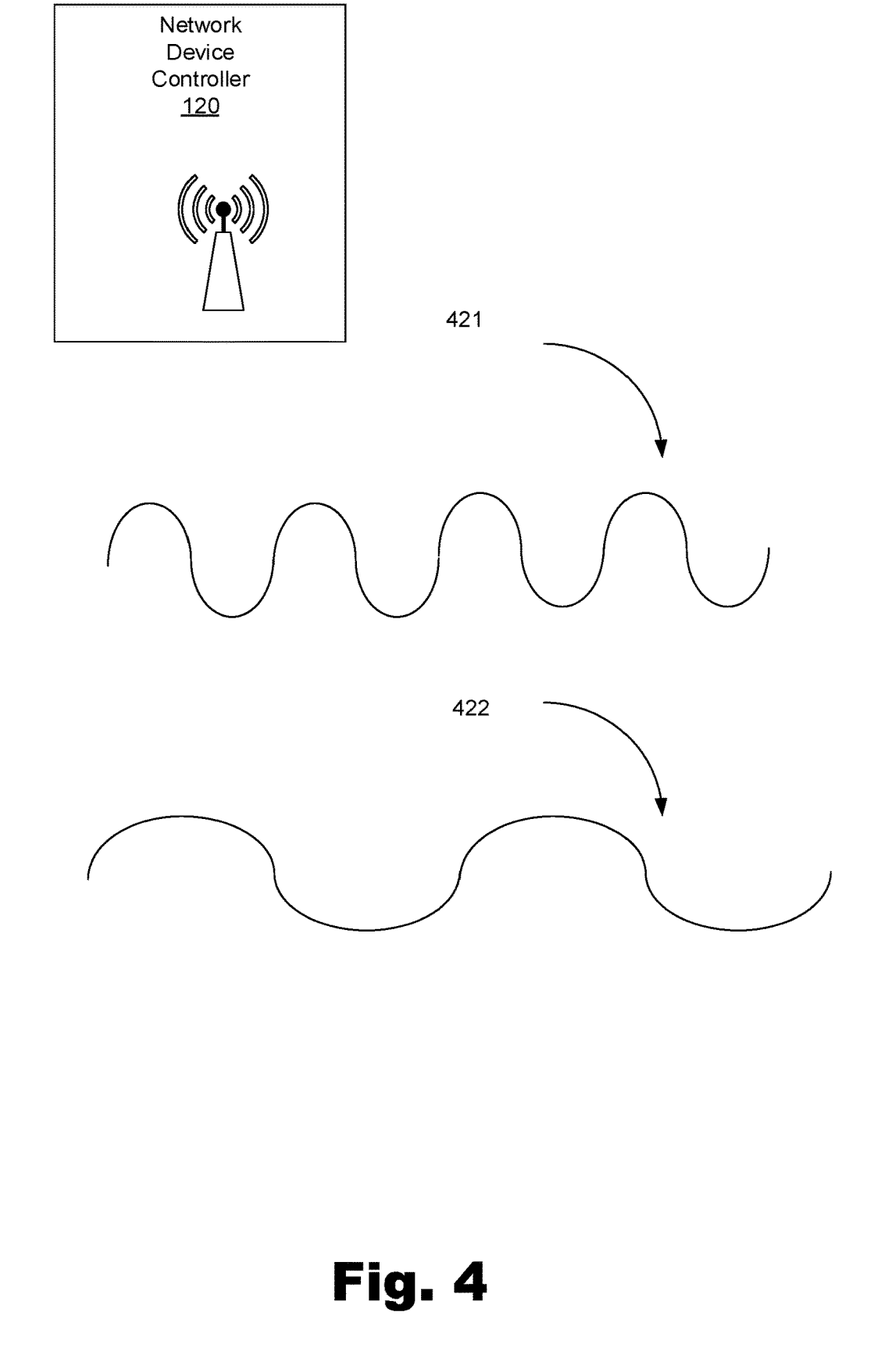
FIG. 4 illustrates a number of radio waves transmitted by an apparatus.

FIG. 4 illustrates a number of radio waves as may be transmitted by the network device controller (120). A first radio signal (421) may be compared to a second radio signal (422). The first radio signal (421) has a shorter wave length when compared to the second radio signal (422). It corresponds that the longer wavelength of the second radio signal (422) may have a lower frequency. In some instances, a lower frequency may carry less data than a higher frequency.

Figure 5:
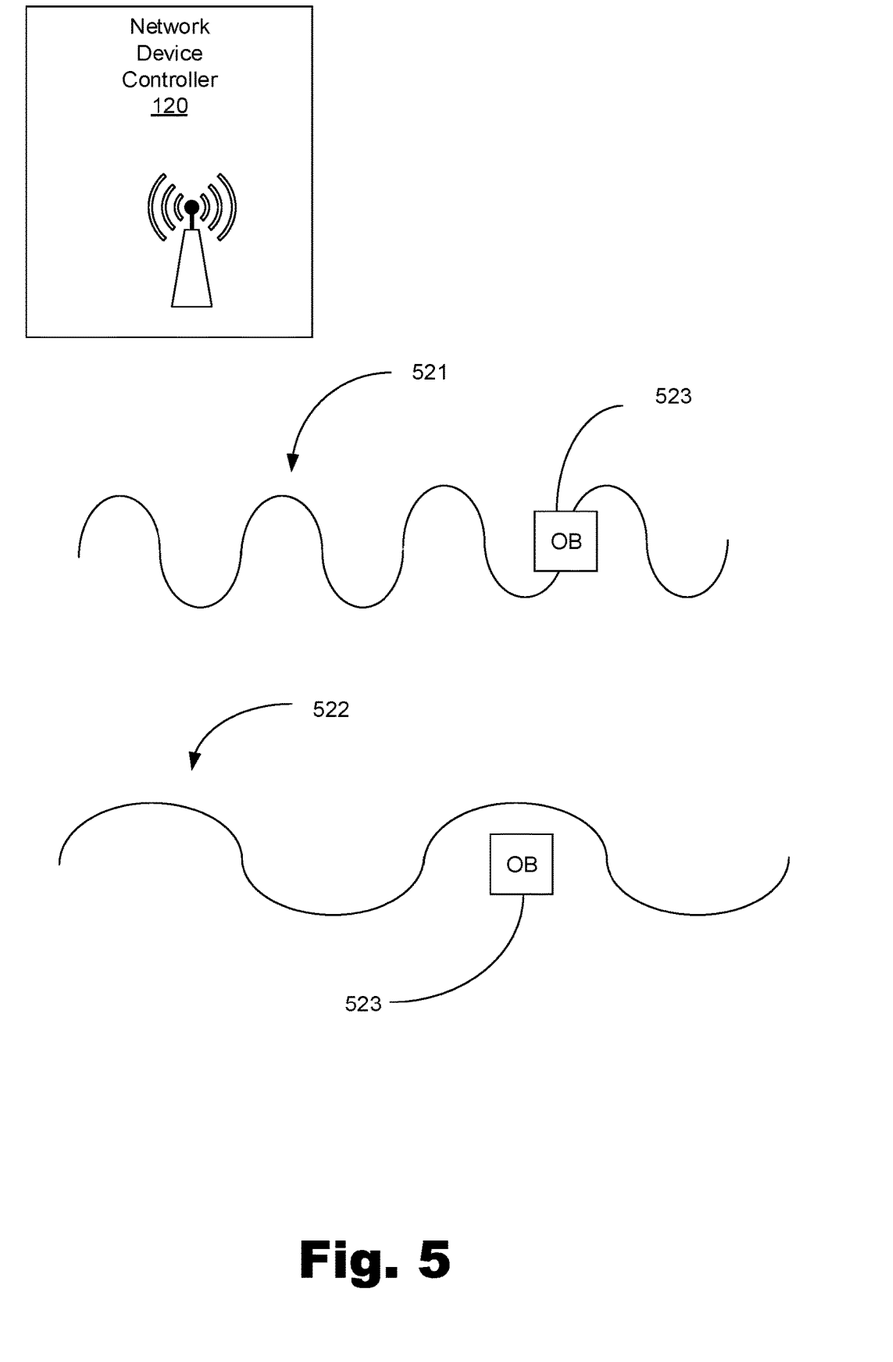
FIG. 5 illustrates a number of radio waves transmitted by an apparatus where the radio waves may be inhibited by environmental barriers.

FIG. 5 illustrates a number of radio waves that may be transmitted by the network device controller (120). A first radio signal (521) may be compared to a second radio signal (522). The first radio signal (521v) has a shorter wave length when compared to the second radio signal (522). The radio signal with the longer wavelength (522) may avoid interference from various objects (523). The avoidance of interference with propagation may allow radio waves to propagate further without consuming additional power. The longer wavelength and improved propagation comes at the cost of transmitting less data. When the network device controller (120) communicates with a remote device (FIG. 1, 131), the transmission may take longer or have more interference. A smaller packet may allow the data that may actually be used to be transmitted in similar amounts of time a packet transmitted using a networking protocol.

Figure 6:
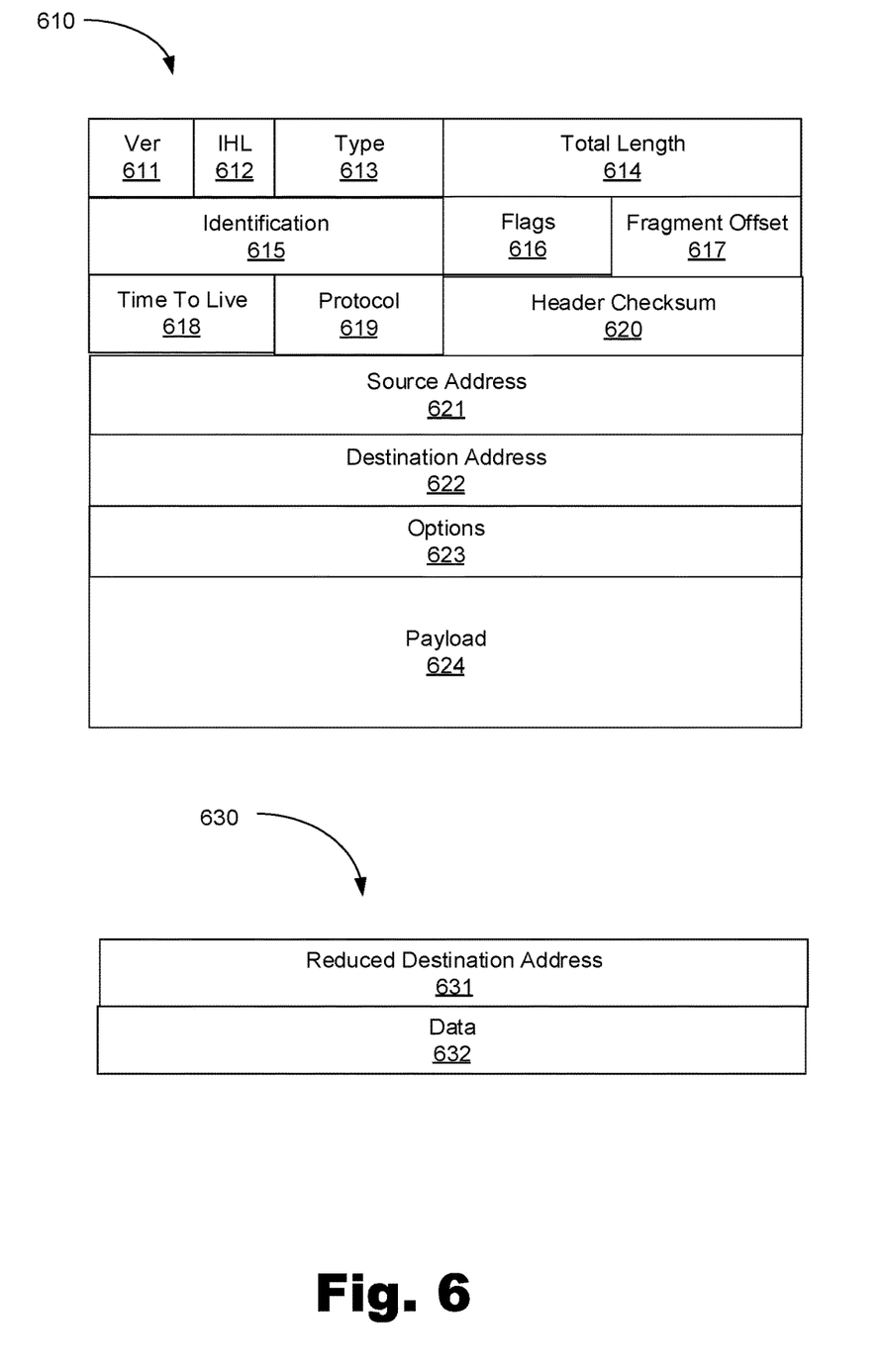
FIG. 6 illustrates a network packet and a reduced network packet as sent and received by a method for communicating with a control server and a household device.

FIG. 6 illustrates a number of data packets as sent or received by the Network Device Controller (FIG. 1, 120). In one example, the remote device (FIG. 1, 131) sends a reduced packet (630) containing a reduced destination address (631) and data (632). The reduced packet (630) is sent using a wireless protocol from the remote device (FIG. 1, 131) to the network device controller (FIG. 1, 120). The network device controller (FIG. 1, 120) then wraps the reduced packet (630) as payload data (624) in a network packet (610) to be transmitted over a computer network using Internet Protocol Version Four (IPv4)

The network packet (610) may be sent or received over a computer network. In this example, IPv4 is depicted. In a different example, a different networking protocol may be received. The network packet (610) includes a version (611), an IHL (612), a type (613), a total length (614), an identification (615), a number of flags (616), a fragment offset (617), a time-to-live (618), a protocol flag (619), a header checksum (620), a source address (621), a destination address (622), a number of options, (623), and a payload (624). The payload (624) is assigned the values of the reduced packet (630).

The network packet (610) is sent through a network router (FIG. 2, 211) to a control server (FIG. 1, 110). The control server (FIG. 1, 110) may send back a response network packet that wraps a response reduced packet. The network device controller (FIG. 1, 120) receives the response network packet, unwraps the response reduced packet, and sends the response reduced packet to the remote device (FIG. 1, 131).

A number of data packets may be received or sent by the Network Device Controller (FIG. 1, 120). The network packet (610) may be received over a computer network. In one example, an Internet Protocol Version Four (IPv4) is shown. In one example, the reduced packet (630) received as payload in an IPv4 packet includes a reduced destination address (631) and data (632).

Figure 7:
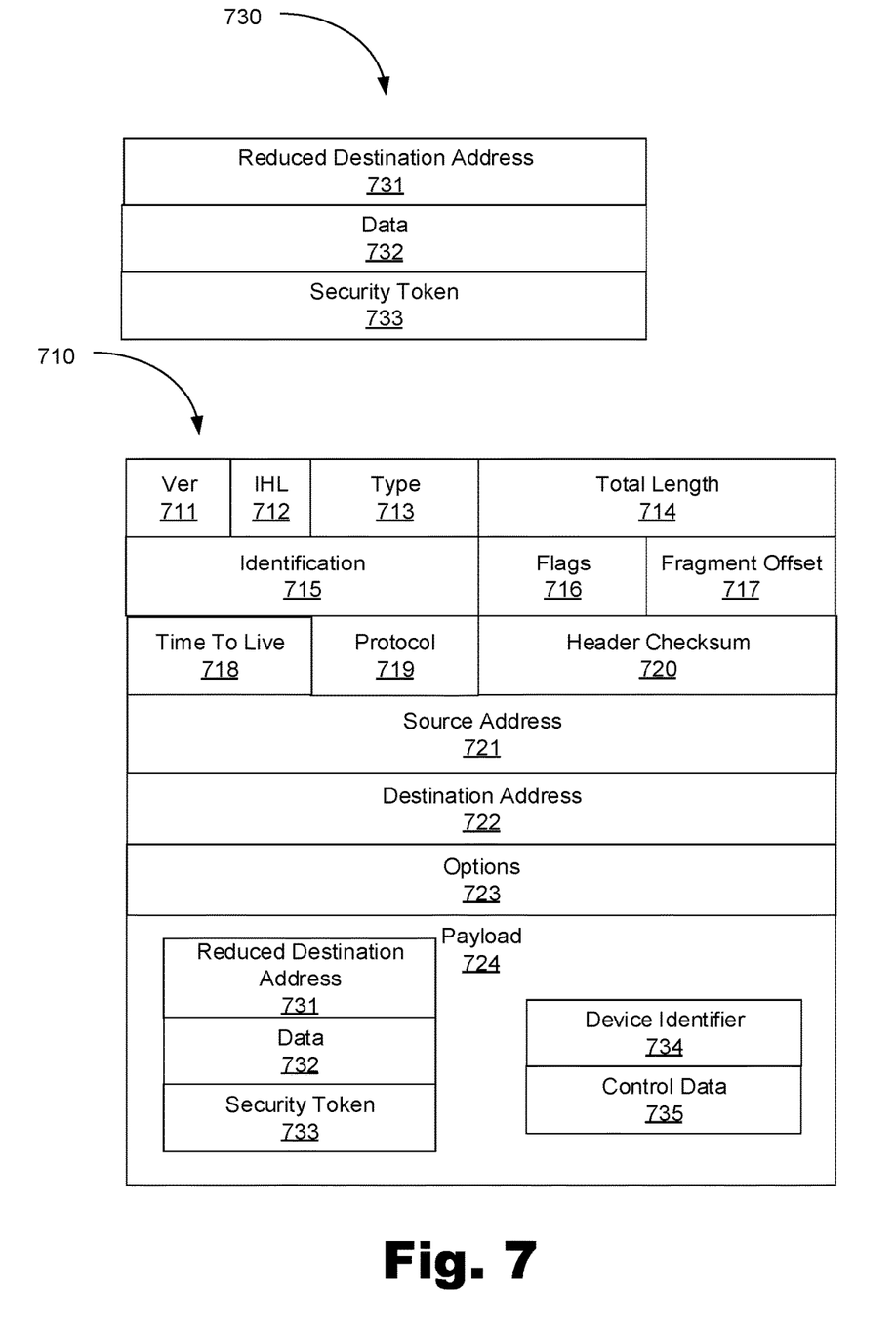
FIG. 7 illustrates a network packet and a reduced network packet as sent and received by a method for communicating with a control server and a household device.

FIG. 7 illustrates a number of data packets as sent or received by the Network Device Controller (FIG. 1, 120). In one example, the remote device (FIG. 1, 131) sends a reduced packet (730) containing a reduced destination address (731), data (732), and a security token (733). The reduced packet (730) is sent using a wireless protocol from the remote device (FIG. 1, 131) to the network device controller (FIG. 1, 120). The network device controller (FIG. 1, 120) then wraps the reduced packet (730) as payload data (724) in a network packet (710) to be transmitted over a computer network using Internet Protocol Version Four (IPv4)

The network packet (710) may be sent or received over a computer network. In this example, IPv4 is depicted. In a different example, a different networking protocol may be received. The network packet (710) includes a version (711), an IHL (712), a type (713), a total length (714), an identification (715), a number of flags (716), a fragment offset (717), a time-to-live (718), a protocol flag (719), a header checksum (720), a source address (721), a destination address (722), a number of options, (723), and a payload (724). The payload (724) is assigned the values of the reduced packet (730). As illustrated, the payload (724) includes a reduced destination address (731), data (732), and a security token (733). Additional data may be assigned to the payload (724), to manage communication between the remote device (FIG. 1, 131) and the control server (FIG. 1,110). As illustrated, the payload (724) includes a device identifier (734) and control data (735)

The network packet (710) is sent through a network router (FIG. 2, 211) to a control server (FIG. 1, 110). The control server (FIG. 1, 110) may send back a response network packet that wraps a response reduced packet. The network device controller (FIG. 1, 120) receives the response network packet, unwraps the response reduced packet, and sends the response reduced packet to the remote device (FIG. 1, 131).

FIG. 7 illustrates a number of data packets as received or sent by the Network Device Controller (FIG. 1, 120). The network packet (710) may be received over a computer network. In one example an Internet Protocol Version Four (IPv4) packet is shown. In another example, the reduced packet (730) may include a reduced destination address (731), data (732), and a security token (733). The security token (733) may authenticate a remote device (FIG. 1, 131) and the network device control (FIG. 1, 120).

Figure 8:
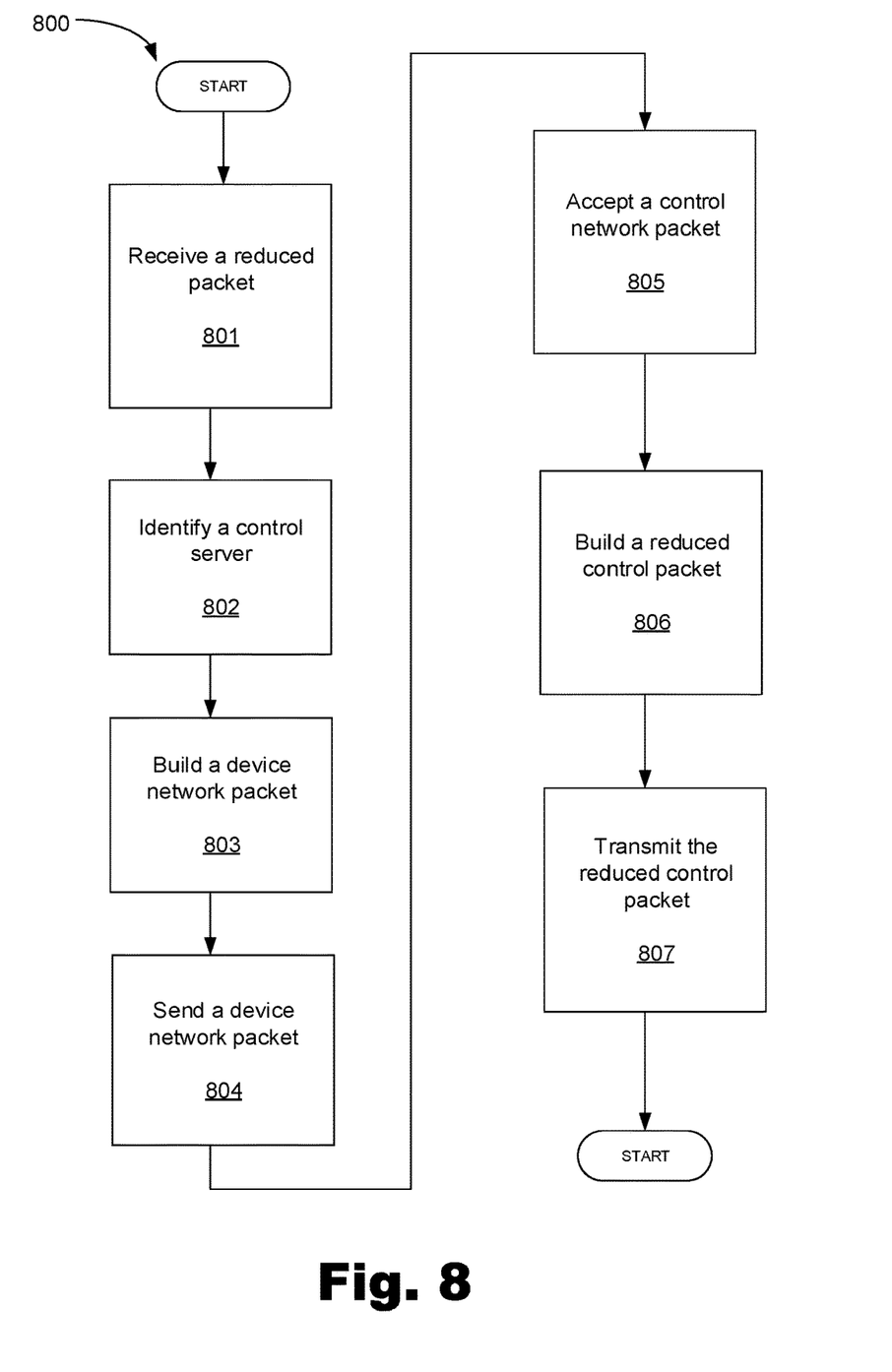
FIG. 8 illustrates an example of a method for communicating with a control server and a device.

FIG. 8 is a flow chart of a method for sending communication between a remote device and a control server. The method includes receiving (801) a reduced packet from a remote device when a reduced server identifier in the reduced packet matches a value indicating a control server, identifying (802), based on the reduced server identifier, a control server, constructing (803) a device network packet to send to the control server based on the reduced packet, sending (804), over a computer network, to the control server, the device network packet, accepting (805) over the computer network, from the control server, a control network packet, building a reduced control packet, the reduced control packet comprising the reduced server identifier and a control instruction, and transmitting (807), using a wireless transmission medium, the reduced control packet to the remote device.

The method includes receiving (801) a reduced packet from a remote device when a reduced server identifier in the reduced packet matches a value indicating a control server. A reduced packet is generated by a remote device. The reduced packet is smaller than a network packet. The reduced packet may contain a reduced server identifier and data. The reduced packet may contain only a reduced server identifier and data. The reduced packet may contain a reduced server identifier, data, and a security token. The reduced packet may contain only a reduced server identifier, data, and a security token. The reduced server identifier may be a subset of a network address of a server. The reduced server identifier may be derived based on server identification. The reduced server identifier is smaller than a server network address. The reduced packet is received as though it had been received directly by the control server.

The method includes identifying (802), based on the reduced server identifier, a control server. The reduced server identifier may be a subset of the server address. The reduced server identifier may be a two byte subset of an address of the control server. The reduced server identifier may be a two byte value derived from the address of an address of a server to consume less data space than the address of the server. In one example, the last octet of the server address is 123. A remaining three server octets are added to the reduced server identifier to yield the server IPv4 address. In this example, the last octet is appended to 192.168.0 to yield an IPv4 address of 192.168.0.123. In another example the reduced server identifier is an 8 bit value used as a token in an abstract data type to look up a server address. In this example, a reduced server identifier is the number 8. A search is made for the address of a server that uses identifier 8 to yield the address of the server.

The method includes constructing (803) a device network packet to send to the control server based on the packet. In a first example, the reduced packet is assigned as the payload data to an IPv4 Network packet. In another example, the reduced packet is examined to create a set of server information for a control server. The network packet may contain additional information.

The method includes sending (804), over a computer network, to the control server, the device network packet. The computer network may be a wired computer network, such as an Ethernet connection or a fiber-optic connection. The network connection may be a wireless connection. The computer network may use the same interface as the interface used to receive the reduced packet.

The method includes accepting (805), over the computer network, from the control server, a control network packet. The control network packet is received as a response to the network packet. The control network packet may include a reduced response packet as payload data. A reduced response packet may be derived from the control network packet.

The method includes building (806) a reduced control packet, the reduced control packet comprising the reduced server identifier and a control instruction. The reduced control packet appears to have been sent directly by the control server.

The method includes transmitting (807), using a wireless transmission medium, the reduced control packet to the remote device.

An overall example using FIG. 8 will now be given. A reduced packet is received (801) from a remote device (FIG. 1, 131). The remote device (FIG. 1, 131) in this example is a door knob that a person is trying to unlock. The reduced packet includes a security code entered by the person. The reduced packet includes a reduced server identifier identifying the control server (FIG. 1, 110). The remote device controller (FIG. 1, 120) receives a packet, because the reduced server identifier identifies a known control server (FIG. 1, 110) and portrays to the remote device (FIG. 1, 131) that it is the specified control server (FIG. 1, 110). The data in the reduced packet contains information regarding the actions of the person to unlock the door. The data may include a combination of user identification.

The remote device controller (FIG. 1, 120) identifies a control server (FIG. 1, 120) based on the reduced server identifier. The identification includes looking up a full control server address based on the reduced server identifier.

The remote device controller (FIG. 1, 120) then constructs a device network packet to send to the control server (FIG. 1, 110) over a computer network. The device network packet includes a network header that allows the data to be routed over the computer network.

The remote device controller (FIG. 1, 120) sends, over a computer network, to the control server, the device network packet. The computer network is a connection to the internet, and the control server (FIG. 1, 110) is at a physically separate location.

In response to the device network packet, the remote device controller (FIG. 1, 120) receives a control network packet. The control network packet is sent by the control server (FIG. 1, 110) to the remote device (FIG. 1, 131). The control server (FIG. 1, 110) may send a reduced packet as the payload in the control network packet.

The remote device controller (FIG. 1, 120) builds a reduced control packet. In this example, the reduced control packet is built by removing the payload data from the control network packet. By sending the reduced control packet, the remote device controller (FIG. 1, 120) appears to the remote device (FIG. 1, 131) to be the control server.

Figure 9:
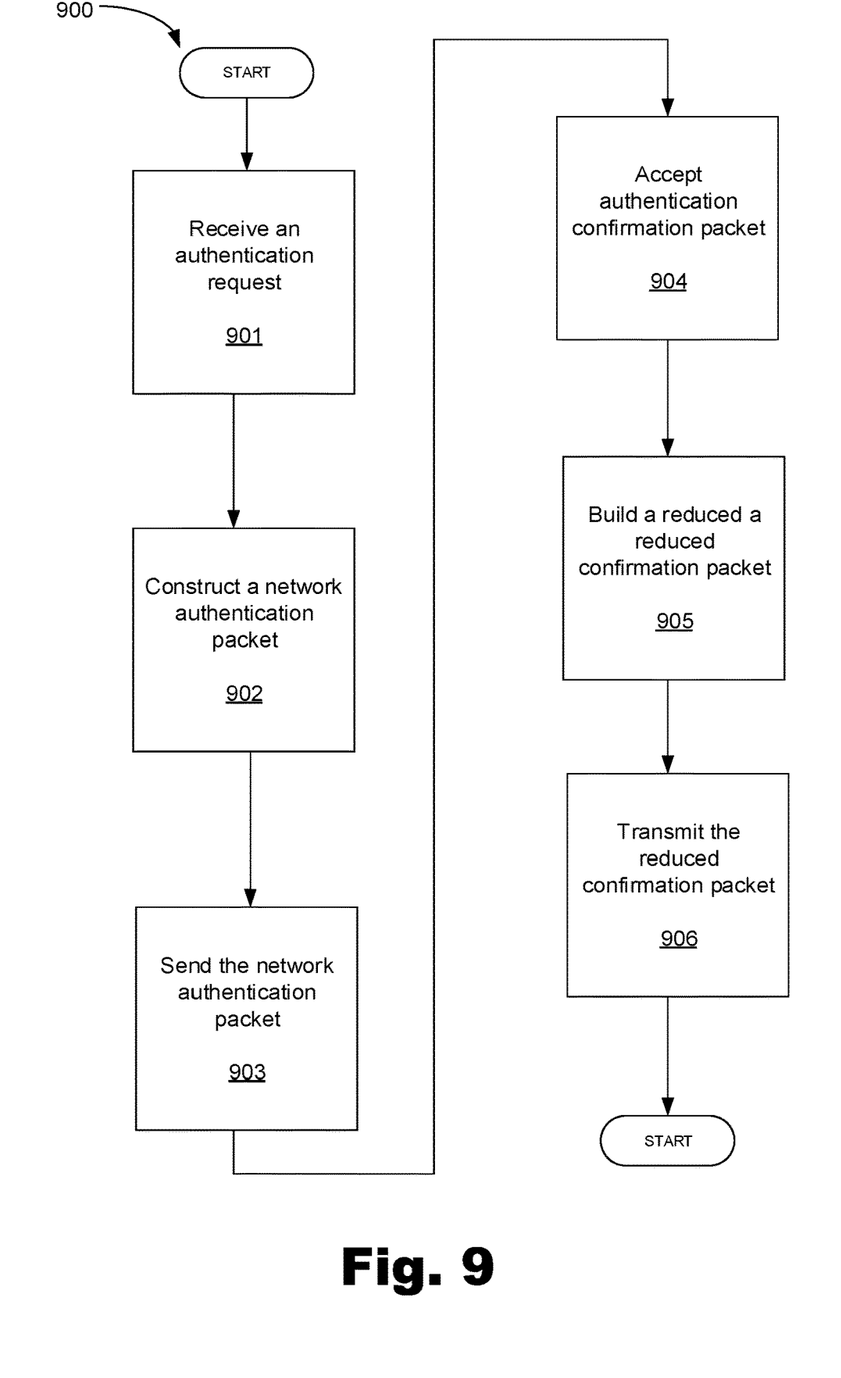
FIG. 9 illustrates an example of a method for authenticating a control server and a device.

FIG. 9 illustrates a method for authenticating a remote device and a control server, according to one example of the principles described herein. An authentication request packet is received (901) from a remote device, the authentication request indicating a request to authenticate with a control server. A network authentication packet is constructed (902) to send to the control server based on the reduced packet. The network packet consists of a network protocol header and the authentication request packet. The network authentication packet is sent (903) over a computer network to a control server. An authentication confirmation packet is accepted (904) from the control server over the computer network. A reduced confirmation packet is built (905). The reduced confirmation packet comprises a reduced device identifier and an authentication confirmation code. The reduced confirmation packet is transmitted (906) to the remote device using a wireless transmission medium.

An authentication request packet is received (901) from a remote device, the authentication request indicating a request to authenticate with a control server. The authentication request is a reduced packet generated by the remote device. The authentication request may indicate a reduced server identifier which with the remote device will authenticate. The authentication request may allow a device implementing the method to identify a server with which the remote device will authenticate.

A network authentication is constructed (902) to send to the control server based on the reduced packet. The network packet consists of a network protocol header and the authentication request packet. The authentication request packet includes data to authenticate the remote device with a control server.

A network authentication packet is sent (903) over a computer network to a control server. The network authentication packet is sent using any networking protocol.

An authentication confirmation packet is accepted (904), over the computer network, from the control server. The authentication confirmation packet is a network packet confirming the authentication of the remote device with the server and may include information, such as a security token, to be used by the remote device in communicating with the control server.

A reduced confirmation packet is built (905). The reduced confirmation packet may include a reduced device identifier and an authentication confirmation code. The reduced confirmation packet is in the same format as a reduced data packet.

The reduced confirmation packet is transmitted (906) to the remote device using a wireless transmission medium. The transmission appears to be directly communicated from the control server.

An overall example according to FIG. 9 will now be given. The remote device (FIG. 1, 131) enters into an authentication mode and sends a request to authenticate with a control server. The remote device controller (FIG. 1, 120) receives an authentication request packet from the remote device (FIG. 1, 131). The authentication request packet is the same format as the reduced packet.

The authentication request packet in this example allows the remote device controller (FIG. 1, 120) to select a control server (FIG. 1, 110) with which the remote device (FIG. 1, 131) will authenticate. The remote device controller (FIG. 1, 120) identifies a control server (FIG. 1, 110) for the remote device (FIG. 1, 131).

The remote device controller (FIG. 1, 120) constructs a network packet based on the authentication request packet to construct a network packet. The network packet includes the authentication request packet as payload to the network packet.

The remote device controller (FIG. 1, 120) sends the network packet to the control server (FIG. 1, 120). The control server (FIG. 1, 110) may then examine the payload data as if it had directly received the authentication request packet. The control server (FIG. 1, 110) prepares a response to the authentication request packet.

The remote device controller (FIG. 1, 120) accepts an authentication confirmation packet from the control server (FIG. 1, 110). The authentication confirmation packet includes the control server identifier and an indicator that authentication has been completed successfully.

The remote device controller (FIG. 1, 120) builds a reduced confirmation packet. In this example, the reduced confirmation packet consists of a device identifier, and sets the data payload as the control server identifier.

The remote device controller (FIG. 1, 120) the receives a network response packet from the control server (FIG. 1, 120)

A reduced confirmation packet is built (905) based on the network response packet. The reduced confirmation packet may include a reduced device identifier and an authentication confirmation code. The reduced confirmation packet is the same format as a reduced data packet.

The reduced confirmation packet is transmitted (906) to the remote device using a wireless transmission medium. The transmission appears to be directly communicated from the control server.

Figure 10:
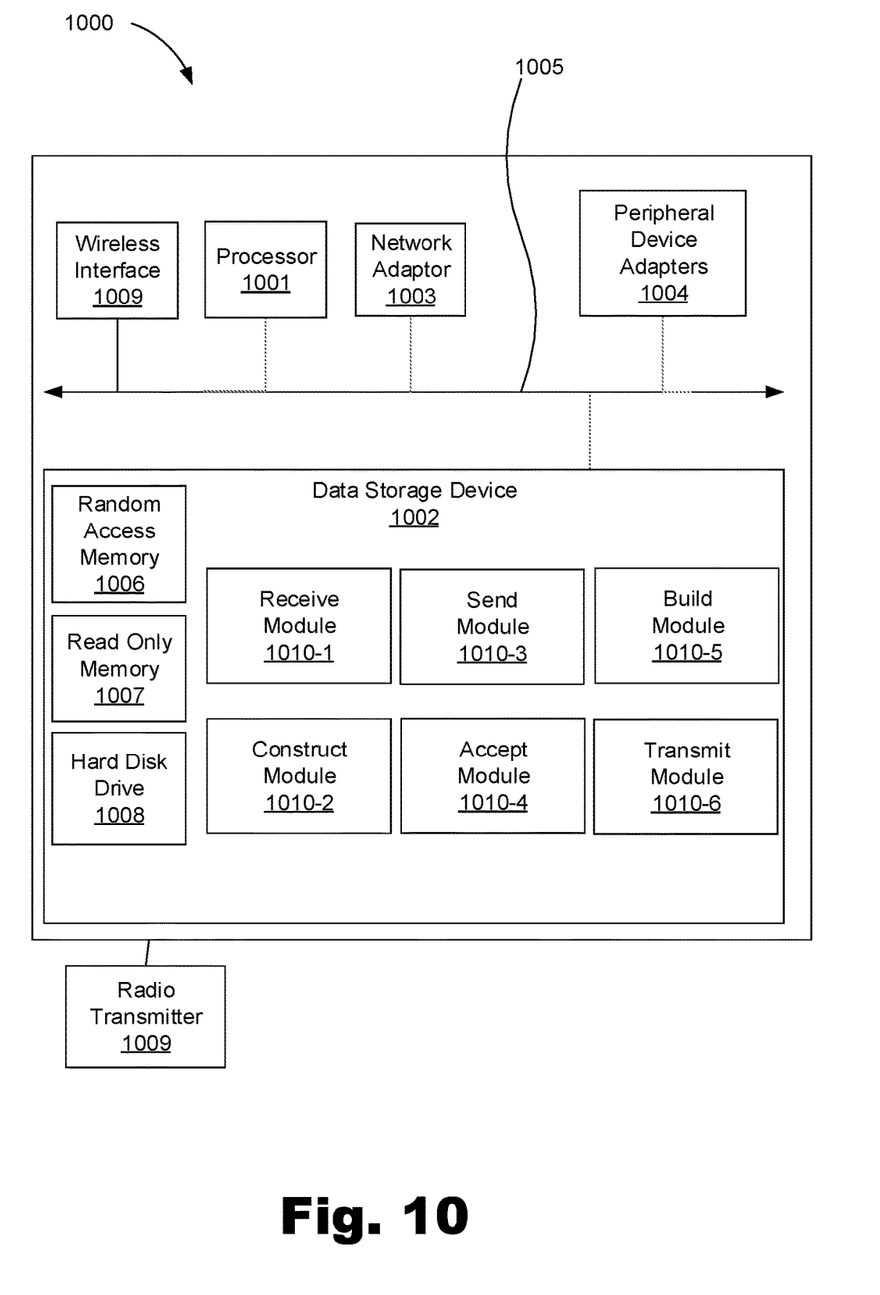
FIG. 10 illustrates an apparatus that communicates with a control server and a household device.

FIG. 10 represents a computer device (1000) for handling communication between a remote device and a control server. The computing device (1000) may be utilized in any data-processing scenario, including stand-alone hardware, mobile applications, a computing network, or combinations thereof. Further, the computing device (1000) may be used in a computing network, a public cloud network, a private cloud network, a hybrid cloud network, other forms of networks, or combinations thereof. In one example, the methods provided by the computing device (1000) are provided as a service over a network by, for example, a third party. In this example, the service may comprise, for example, the following: a Software as a Service (SaaS) hosting a number of applications; a Platform as a Service (PaaS) hosting a computing platform comprising, for example, operating systems, hardware, and storage, among others; an Infrastructure as a Service (IaaS) hosting equipment such as, for example, servers, storage components, networks, and components, among others; an application program interface (API), or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the computing device (800) are executed by a local administrator.

To achieve its desired functionality, the computing device (1000) may include various hardware components. Among these hardware components may be a number of processors (1001), a data storage device (1002), a number of peripheral adapters (1004), and a number of network adapters (1003). These hardware components may be interconnected through the use of a number of buses and/or network connections. In one example, the processor (1001), data storage device (1002), peripheral device adapters (1004), and network adapter (1003) may be communicatively coupled via a bus (1005).

The computing device (1000) may include various types of memory modules, including volatile and nonvolatile memory. For example, the data storage device (1002) may include Random Access Memory (RAM) (1006), Read Only Memory (ROM) (1007), and Hard Disk Drive (HDD) memory (1008). Many other types of memory may also be utilized, and the present specification contemplates the use of as many varying types) of memory in the computing device (1000) as may suit a particular application of the principles described herein. In other examples, different types of memory in the computing device (1000) may be used for different data storage needs. In some examples, the processor (1001) may boot from Read Only Memory (ROM) (1007), maintain nonvolatile storage in the Hard Disk Drive (HDD) memory (1008), and execute program code stored in Random Access Memory (RAM) (1006).

Generally, the computing device (1000) may comprise a computer readable medium, a computer readable storage medium, or a non-transitory computer readable medium, among others. For example, the computing device (1000) may be, but is not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store computer usable program code for use by, or in connection with, an instruction execution system, apparatus, or device. In another example, a computer readable storage medium may be any non-transitory medium that can contain or store a program for use by, or in connection with, an instruction execution system, apparatus, or device.

The hardware adapters (1003, 1004) in the computing device (1000) enable the processor (1001) to interface with various other hardware elements, external and internal to the computing device (1000). The peripheral device adapters (1004) may provide an interface to input/output devices, such as a radio transmitter (1009), to communicate with a remote device. The peripheral device adapters (1003) may also provide access to other external devices, such as an external storage device, a number of network devices, such as servers, switches, and routers, client devices, other types of computing devices, or combinations thereof.

The radio transmitter device (1009) may be provided to allow the computing device (1000) to interact with a remote device (FIG. 1, 131). The peripheral device adapters (1004) may create an interface between the processor (1001) and the radio transmitter (1009), a printer, or other media output devices. The network adapter (1003) may provide an interface to other computing devices within, for example, a network, thereby enabling the transmission of data between a communication receiving module to receive, from a device, a communication packet.

The receive module (1010-1) receives a reduced packet from a remote device using the wireless communication interface (1009), when a reduced server identifier in the reduced packet matches a value indicating a control server, the reduced packet comprising a reduced server identifier and data payload.

The construct module (1010-2) constructs a device network packet to send to the control server based on the reduced packet. The device network packet comprises both a data payload and a network header. The network header allows the device network packet to be sent over a computer network.

The send module (1010-3) sends the device network packet to the control server using a computer communication interface, such as a network adapter (1003).

The accept module (1010-4) accepts a control network packet using the network communication interface (1003). The control packet is generated by the control server for the remote device.

The build module (1010-5) builds a reduced control packet. The reduced control packet may include a reduced server identifier to identify the server authenticating with the remote device. The reduced control packet may include a control instruction to instruct the remote device regarding the communication with the control server.

The transmit module (1010-6) transmits the reduced control packet using the wireless interface (1009).

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

The invention claimed is:

1. A method for sending communication between a remote device and a control server, the method comprising:
receiving a reduced packet from a remote device when a reduced server identifier in the reduced packet matches a value indicating a control server, the reduced packet comprising the reduced server identifier and a data payload;
identifying, based on the reduced server identifier, the control server;
constructing a device network packet to send to the control server based on the reduced packet, wherein a payload data in the device network packet consists of the reduced packet and a security token;
sending over a computer network to the control server, the device network packet;
accepting over the computer network, from the control server, a control network packet;
building a reduced control packet, the reduced control packet comprising the reduced server identifier and a control instruction; and
transmitting, using a wireless transmission medium, the reduced control packet to the remote device.

2. The method of claim 1, wherein the reduced server identifier is a subset of an address of the control server.

3. The method of claim 1, wherein the reduced server identifier is derived from the address of an address of a server to consume less data space than the address of the server.

4. The method of claim 1, wherein payload data in the device network packet consists of the reduced packet.

5. A method for authenticating a remote device with a control server, the method comprising:
receiving a reduced authentication request packet from the remote device, the reduced authentication request packet indicating a request to authenticate with the control server, wherein the reduced authentication request packet comprising a reduced server identifier and a data payload;

identifying, based on the reduced server identifier, the control server;

constructing a network authentication packet to send to the control server based on the reduced authentication request packet, the network authentication packet consisting of a network protocol header and the reduced authentication request packet;

sending, over a computer network to the control server, the network authentication packet;

accepting, over the computer network, from the control server, an authentication confirmation packet;

building a reduced confirmation packet, the reduced confirmation packet comprising the reduced server identifier and an authentication confirmation code; and transmitting, using a wireless transmission medium, the reduced confirmation packet to the remote device.

6. The method of claim 5, wherein the authentication confirmation packet consists of a network protocol header and a reduced confirmation packet.

7. The method of claim 6, wherein the reduced confirmation packet includes a reduced device identifier and the reduced server identifier.

8. An apparatus to authenticate a remote device, the apparatus comprising:
a processor;
a wireless communication interface;
a network communication interface;
a non-transitory storage unit comprising computer program code that, when executed by the processor, causes the processor to:
receive a reduced packet from the remote device using the wireless communication interface, when a reduced server identifier in the reduced packet matches a value indicating a control server, the reduced packet comprising the reduced server identifier and a data payload;
identify, based on the reduced server identifier, the control server;
construct a device network packet to send to the control server based on the reduced packet, wherein a payload data in the device network packet consists of the reduced packet and a security token;
send, using the network communication interface, to the control server, the device network packet;
accept, using the network communication interface, from the control server, a control network packet;
build a reduced control packet, the reduced control packet comprising the reduced server identifier and a control instruction; and transmit, using the wireless communication interface, the reduced control packet to the remote device.

9. The apparatus of claim 8, wherein the reduced server identifier is a two byte subset of an address of the control server.

10. The apparatus of claim 8, wherein the reduced server identifier is a two byte value derived from the address of an address of a server to consume less data space than the address of the server.

11. The apparatus of claim 8, wherein the reduced server identifier is a one byte value derived from the address of an address of a server to consume less data space than the address of the server.

12. The apparatus of claim 8, wherein the network communication interface is a second wireless communication interface.

13. The apparatus of claim 9, wherein the non-transitory storage unit further comprises instructions for randomly changing the reduced server identifier every two weeks.

14. The apparatus of claim 13, wherein the non-transitory storage unit further comprises instructions for building two reduced control packets, the first reduced control packet comprising the reduced server identifier and control instruction and second reduced control packet comprising a full server identifier and a non-secure control instruction.

15. The apparatus of claim 14, wherein the non-transitory storage unit comprises code to identify, based on the reduced server identifier, a control server only after the control server has sent three instructions to a remote device requesting in the first instruction that the remote device send an encrypted remote device identifier to the control server, in the second instruction that the remote device send an encrypted remote device identifier to the control server, and in the third instruction that the remote device relay the remote device identifier to a second remote device with an instruction that the second remote device combine the remote device identifier with a 7 digit randomized number to form a remote device identifier.

16. The apparatus of claim 9, wherein the non-transitory memory storage unit comprises code to construct the reduced control packet and then open the remote device using the reduced control packet that is between 22% and 36% of the size of a full instruction using a full internet protocol header.

17. The apparatus of claim 9, wherein the non-transitory storage unit comprises code to construct the reduced control packet and then open the remote device using the reduced control packet that is between 2% and 16% of the size of a full instruction using a full internet protocol header.

* * * * *